United States Patent
Lohwasser et al.

(10) Patent No.: US 7,008,501 B2
(45) Date of Patent: *Mar. 7, 2006

(54) STERILISABLE COMPOSITE FILM FOR PACKAGING PURPOSES

(75) Inventors: Wolfgang Lohwasser, Gailingen (DE); Olaf Frei, Siblingen (CH)

(73) Assignee: Alcan Technology & Management, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,261

(22) Filed: Jun. 11, 2003

(65) Prior Publication Data

US 2003/0211243 A1    Nov. 13, 2003

Related U.S. Application Data

(62) Division of application No. 10/318,091, filed on Dec. 13, 2002, now Pat. No. 6,878,229, which is a division of application No. 09/856,573, filed as application No. PCT/EP99/09393 on Dec. 2, 1999, now Pat. No. 6,652,957.

(30) Foreign Application Priority Data

Dec. 8, 1998    (EP) .................................. 98811206

(51) Int. Cl.
*B32B 31/06*    (2006.01)
*B32B 31/22*    (2006.01)

(52) U.S. Cl. ...................... 156/276; 156/278; 156/279; 428/216; 428/451

(58) Field of Classification Search ........... 156/244.11, 156/278, 308.4, 290; 428/216, 469; 427/162, 427/248.1, 255.37, 535
See application file for complete search history.

(56) References Cited

U.S. PATENT DOCUMENTS 3,442,686 A * 5/1969 Jones .......................... 428/336

| | | | |
|---|---|---|---|
| 5,084,356 A | 1/1992 | Deak et al. | |
| 5,085,904 A * | 2/1992 | Deak et al. ................. | 428/35.7 |
| 5,100,720 A * | 3/1992 | Sawada et al. ............. | 428/215 |
| 5,436,035 A * | 7/1995 | Lohwasser ................. | 427/525 |
| 5,508,075 A | 4/1996 | Roulin et al. | |
| 5,532,063 A * | 7/1996 | Shindoh et al. ............. | 428/446 |
| 5,670,224 A | 9/1997 | Izu et al. | |
| 5,725,958 A * | 3/1998 | Matsuda et al. ............ | 428/446 |
| 5,770,301 A * | 6/1998 | Murai et al. ................ | 428/213 |
| 5,795,628 A * | 8/1998 | Wisard et al. .............. | 427/566 |
| 5,830,545 A | 11/1998 | Frisk | |
| 5,955,181 A | 9/1999 | Peiffer et al. | |
| 6,027,793 A * | 2/2000 | Lohwasser et al. ......... | 428/216 |
| 6,277,496 B1 | 8/2001 | Lohwasser et al. | |
| 6,428,882 B1 | 8/2002 | Peiffer et al. | |
| 6,517,932 B1 | 2/2003 | Peiffer et al. | |
| 6,548,108 B1 | 4/2003 | Lohwasser et al. | |
| 2004/0142182 A1 * | 7/2004 | Olofsson et al. ......... | 428/423.5 |

FOREIGN PATENT DOCUMENTS

EP    0 484 275 A1    10/1991
WO    98/53115    11/1998

OTHER PUBLICATIONS

Abstract, Section Ch., Week 9325, Derwent Publications, Ltd., AN 93-201537.

* cited by examiner

*Primary Examiner*—Melvin Mayes
(74) *Attorney, Agent, or Firm*—Fisher Christen & Sabol

(57) ABSTRACT

The process for preparing a composite film for packaging purposes, that includes coextruding polyethylene terephthalate (PET) and polyethylene-2, 6-naphtalate (PEN) to form a film of polyethylene-2,6-naphthalate. On at least one of the at least one PEN-coated side, a ceramic layer of $SiO_x$, where x is number between 0.9 and 2, is deposited by means of the thin-film vacuum process through the simultaneous vaporization of silicon dioxide ($SiO_2$) and metallic silicon, or by the vaporization of silicon monoxide (SiO) in a vacuum. Each of the at least one ceramic layers of $SiO_x$ having a thickness of 10 nm to 200 nm. The resultant composite film retains effective permeability barrier effect for water vapor and gases after sterilization in a water bath or in water vapor at a temperature of more than 90° C.

18 Claims, No Drawings

STERILISABLE COMPOSITE FILM FOR PACKAGING PURPOSES

This application is a division of U.S. Ser. No. 10/318,091, filed on Dec. 13, 2002, now U.S. Patent No. 6,878,229, issued on May 12, 2005, that is a division of U.S. Ser. No. 09/856,573, filed on May 24, 2001, now U.S. Pat. No. 6,652,957, issued on Nov. 25, 2003, that is a 371 U.S. National Stage Application of PCT/EP99109393, filed on Dec. 2,1999, that has the priority benefit of European Patent Application 98811206.6, filed on Dec. 8, 1998.

The invention concerns a composite film for packaging purposes with good permeability barrier effect for water vapour and gases after sterilisation in a water bath or in water vapour at temperatures of more than 90° C., where the composite film also has as a substantial constituent a barrier layer with $SiO_x$ which is produced by the vaporisation of inorganic materials. Also within the framework of this invention lies a process for the production of the composite film and its usage.

In a recognized method of prolonging the durability of perishable products such as foodstuffs, the products are sterilised in a packaged state. To achieve this the filling material is heated briefly in its sealed packaging by auto-claving in hot water or water vapour at temperatures of up to 130° C.

The known transparent composite films used today for packaging foodstuffs often lack sufficient barrier properties to water vapour, oxygen and aromas after sterilisation treatment. Examples are ethylvinyl alcohols (EVOH) and copolymers of EVOH and polyethylene (PE), the barrier properties of which deteriorate especially in very moist conditions, resulting in a milky appearance. Better barrier properties are achieved by coating a silicon monoxide-coated film of polyethylene terephthalate, but when heated at high temperatures these films show not only a yellowish discoloration but also a decrease in barrier properties.

The invention is therefore based on the tasks of creating a composite film of the type described initially which shows improved barrier properties with regard to water vapour, oxygen and aromas after sterilisation treatment in comparison with state of the art transparent film laminates.

The solution of the task according to the invention leads to the composite film comprising a film of polyethylene terephthalate (PET) Keith a co-extruded layer of polyethylene-2,6-naphthalate (PEN) on at least one side, and the film on at least one of the PEN-coated sides has a 10 to 200 nm thick ceramic layer of $SiO_x$, where x is a number between 0.9 and 2, produced by the simultaneous vaporisation of silicon dioxide ($SiO_2$) and metallic silicon in a vacuum.

The term PEN is used below to mean not only the pure polymer but also a mixture of polymers consisting of at least 60 w. % ethylene-2,6-naphthalate units and up to 40 w. % ethylene terephthalate units and or units of cycloaliphatic or aromatic diols and or dicarbonic acids.

The preferred PEN layer has a polymer consistency of at least 65 w. % ethylene-2,6-naphthalate units and up to 35 w. % ethylene terephthalate units. Particularly preferred is a PEN layer with a polymer consistency of at least 70 w. % ethylene-2,6-naphthalate units and up to 30 w. % ethylene terephthalate units. As stated above, the PEN layer can, however, consist entirely of ethylene-2,6-naphthalate polymers.

Suitable aliphatic diols are for example diethylene glycol, triethylene glycol, aliphatic glycols of the general formula $HO-(CH_2)_n-OH$, whereby n is an integer between 3 and 6 (in particular propane-1,3-diol, butane-1,4-diol, pentane-1,5-diol, and hexane-1,6-diol) or branched chain aliphatic glycols with up to 6 carbon atoms. Suitable cycloaliphatic diols include cyclohexane diols (in particular cyclohexane-1,4-diol) Other suitable aromatic diols correspond for example to the formula $HO-C_6H_4-X-C_6H_4-OH$, where X stands for $-CH_2-$, $-C(CH_3)_2-$, $-C(CF_3)_2-$, $-O-$, $-S-$, or $SO_2$. In addition to the above, bisphenols of the formula $HO-C_6H_4-C_6H_4-OH$ are suitable.

Preferred aromatic dicarbonic acids are benzo-dicarbonic acids, naphthalene dicarbonic acids (for example naphthalene-1,4 or 1,6-dicarbonic acids), biphenyl-x,x'-dicarbonic acids (in particular biphenyl-4,4'-dicarbonic acids), diphenylacetylene-x,x'-dicarbonic acids (in particular diphenylacetylene-4,4'-dicarbonic acids) or stilbene-x,x'-dicarbonic acids. Of the cycloaliphatic dicarbonic acids, cyclohexane dicarbonic acids should be mentioned. Of the aliphatic dicarbonic acids the ($C_3$–$C_{19}$) alkane di-acids are particularly suitable, when the alkane part is either in a straight chain or can be branched.

A preferred method of producing PEN/PET film includes the following steps:

a) production of the film by co-extrusion b) bi-axial extension of the film and c) thermofixing of the extended film.

The PEN layer can be arranged on one or both sides of the PET film. A unilateral attachment of the PEN layer is preferred where a further layer of PET containing extra anti-blocking agents can be attached to the side facing away from the PEN layer.

The PEN layer preferably has a thickness of 0.1 to 4 $\mu$m, in particular 0.2 to 2 $\mu$m. The preferred thickness of the ceramic layer of $SiO_x$ lies between 40 and 150 nm.

In the first preferred variant the x of the $SiO_x$ ceramic layer is a number between 0.9 and 1.2. After sterilisation, a film coated in this way has an oxygen barrier which is 10 times better than that of state of the art films, although there is a degree of yellowing.

In the second preferred variant the x of the $SiO_x$ ceramic layer is a number between 1.3 and 2, in particular between 1.5 and 1.8. A film coated in this way shows even better barrier properties after sterilisation treatment and in particular shows no discoloration.

Depending on its application, the composite film ultimately to be used for packaging purposes may contain, in addition to the PEN/PET film coated with $SiO_x$, further films for example films made out of PET or an oriented polyamide (oPA), or the composite film can be coated, in order to control the sealing qualities, with a sealing layer made for example of polypropylene (PP) or polyethylene (PE). The joining of the individual films into a composite film is usually achieved by means of polyurethane-based laminate adhesives.

The ceramic $SiO_x$ layers can for example be deposited onto the PEN/PET film by processes in thin-film vacuum technology, preferably by electrode beam vaporisation, where in any such case, the ceramic layer is arranged as an interface layer on the PEN-coated side of the composite film and is covered by a further film layer or a laminate adhesive.

By means of a thin-film vacuum process, which is known in itself, a 10 nm to 200 nm thick ceramic layer of $SiO_x$, where x is a number between 0.9 and 2, is deposited by the simultaneous vaporisation in a vacuum of silicon dioxide ($SiO_2$) and metallic silicon. The film coated with the ceramic layer is then laminated with the other films, which can also be printed, into a composite film.

It is preferable that the $SiO_2$ and Si are vaporised together from a single vaporisation source, i.e. from a mixture of $SiO_2$ and Si.

To produce a ceramic $SiO_x$ layer, where x is a number between 1.3 and 2, further substances can be added to the $SiO_2$ as the materials to be vaporised such as $Al_2O_3$, $B_2O_3$, and MgO in quantities of up to 50 mol %, preferably 5 to 30 mol %, always in relation to $SiO_2$.

Further additives which can be added to the materials for vaporisation are for example Al, B and or Mg in their pure form or as Si alloys, in quantities of up to 50 mol %, preferably 5 to 30 mol %, always in relation to Si.

The quantity ratio of $SiO_2$, $Al_2O_3$, $B_2O_3$, and MgO to Si, Al, B and Mg is for example set such that stoichiometrically it gives an oxygen deficiency of between 10 and 30% in relation to the sums of the pure oxides in the vaporised material.

The coating process is controlled by the material vaporisation rate, the deposit rate on the substrate and the exposure period of the substrate in the vacuum chamber atmosphere, such that it produces the desired layer thickness of the $SiO_x$ coating.

In the production of a ceramic layer of $SiO_x$, where x is a number between 0.9 and 1.2, instead of a simultaneous vaporisation of $SiO_2$ and Si, silicon monoxide (SiO) can be vaporised.

A plasma pre-treatment of the PEN/PET film before the $SiO_x$ coating leads to a further improvement in barrier properties against water vapour and oxygen.

The composite film according to the invention is particularly suitable for the production of flexible packaging such as sachets and as a covering material for sealing containers. One particularly preferred application for the composite film according to the invention is for the packaging of basic and luxury food items which are sterilised in their packaged state in a water bath or water vapour at temperatures of more than 90° C.

The composite film according to the invention is also suitable for use as a barrier material in the technical and medical arenas.

The superiority of the composite film according to the invention in comparison with the usual materials in use today with regard to barrier effect against oxygen and water vapour is supported by the measurement results for the said characteristics compiled in Table 1 and Table 2.

The composite films tested have the following composition:

1. PET, coated with SiO/PET/PP
2. PET, coated with $SiO_{1.6}$/PET/PP
3. PET (12 μm)-PEN (1 μm), co-extruded and coated with SiO(100 μm)/PET/PP
4. Layer structure as in 3 but coated with a ceramic layer of the $SiO_{1.6}$ compound.

Composite film No. 1 is a commercially available packaging film described as sterilisable and serves here as a comparison example. Similarly composite film No. 2 is a comparison example. Composite films Nos. 3 and 4 are the composite films according to the invention with ceramic layers of differing composition: this corresponds in composite No. 3 to the SiO formula and in composite No. 4 to the $SiO_{1.6}$ formula.

TABLE 1

Oxygen barriers at 25° C. and 50% r.h. $cm^3/(m^2$ 24 h bar)

| Composite Number | Before sterilisation | After sterilisation at 121° C., 30 mins | After sterilisation 130° C., 30 mins | Before sterilisation after 50 Gelboflex cycles* |
|---|---|---|---|---|
| 1 | 0.3 | 0.3 | 7.0 | 1.8 |
| 2 | 0.2 | 7.0 | 15.0 | 1.8 |
| 3 | 0.07 | 0.08 | 0.12 | 0.4 |
| 4 | 0.08 | 0.5 | 0.7 | 0.5 |

TABLE 2

Water vapour barriers at 25° C. and 100% r.h. in $g/(m^2$ 24 h bar)

| Composite Number | Before sterilisation | After sterilisation at 121° C., 30 mins | After sterilisation 130° C., 30 mins | Before sterilisation after 50 Gelboflex cycles* |
|---|---|---|---|---|
| 1 | 0.3 | 0.3 | 0.8 | 0.3 |
| 2 | 0.2 | 0.8 | 1.2 | 0.3 |
| 3 | 0.1 | 0.1 | 0.1 | 0.1 |
| 4 | 0.1 | 0.2 | 0.3 | 0.1 |

*standardised crushing test to ASTM standard 397-74.

The invention claimed is:

1. A process for preparing a composite film comprising coextruding polyethylene terephthalate (PET) and polyethylene-2,6-naphthalate (PEN) to form a film of polyethylene terephthalate coated directly on at least one side with polyethylene-2,6-naphthalate and depositing directly on the PEN of at least one of the at least one PEN-coated side a ceramic layer of $SiO_x$, where x is a number between 0.9 and 2, by means of thin-film vacuum process through the simultaneous vaporization of silicon dioxide ($SiO_2$) and metallic silicon, or by the vaporization of silicon monoxide (SiO) in a vacuum, each of said at least one ceramic layer of $SiO_x$ having a thickness of 10 nm to 200 nm, the composite film has good permeability barrier for water vapor and gases after sterilization in a water bath or in water vapor at a temperature of more than 90° C.

2. The process according to claim 1, wherein said at least one ceramic layer of $SiO_x$ is formed by the simultaneous vaporization of silicon dioxide and metallic silicon.

3. The process according to claim 2, wherein $SiO_2$ and Si are vaporized together as a mixture.

4. The process according to claim 3, wherein to the materials to be vaporized are added additives in quantities of up to 50 mol percent, always in relation to $SiO_2$.

5. The process according to claim 4, wherein the quantitative ratio of $SiO_2$ to Si is set such that stoichiometrically said quantitative ratio gives an oxygen deficiency of between 10 and 30 percent in relation to the pure oxide in the vaporized material.

6. The process according to claim 4 wherein the additives are $Al_2O_3$, $B_2O_3$ and MgO.

7. The process according to claim 6, wherein the quantitative ratio of $SiO_2$, $Al_2O_3$, $B_2O_3$, and MgO to Si, Al, B and Mg is set such that stoichiometrically said quantitative ratio gives an oxygen deficiency of between 10 and 30 percent in relation to the sums of the pure oxides in the vaporized material.

8. The process according to claim 4, wherein the additives are present in an amount of 5 to 30 mol percent, always in relation to $SiO_2$.

9. The process according to claim 1, wherein before depositing the $SiO_x$, the coextruded film of polyethylene terephthalate and polytheylene-2,6-naphthalate is biaxially extended, thermofixed, and plasma pretreated, the polyethylene-2,6-naphthalate is 0.2 to 2 μm and the thickness of the ceramic layer of $SiO_x$ is between 40 and 150 nm.

10. The process comprising placing the composite film produced according to the process of claim 1 into the form of sachets and flexible container covers as sterilizible packaging for basic and luxury food items.

11. A process for preparing a composite film, comprising coextruding polyethylene terephthalate (PET) and polyethylene-2,6-naphthalate (PEN) to form a film of polyethylene terephthalate coated on at least one side with polyethylene-2,6-naphthalate, subjecting surface of each of the at least one PEN coating on the PET film to plasma pre-treatment and depositing directly on the PEN of at least one of the at least one PEN-coated side a ceramic layer of $SiO_x$, where x is a number between 0.9 and 2 by means of thin-film vacuum process through the simultaneous vaporization of silicon dioxide ($SiO_2$) and metallic silicon, each of said at least one ceramic layer of $SiO_x$ having a thickness of 10 nm to 200 nm, the composite film has good permeability barrier for water vapor and gases after sterilization in a water bath or in a water vapor at a temperature of more than 90° C.

12. The process according to claim 11 wherein $SiO_2$ and Si are vaporized together as a mixture.

13. The process according to claim 12, wherein to the materials to be vaporized are added additives in quantities of up to 50 mol percent, always in relation to $SiO_2$.

14. The process according to claim 13, wherein the quantitative ratio of $SiO_2$ to Si is set such that stoichiometrically said quantitative ratio gives an oxygen deficiency of between 10 and 30 percent in relation to the pure oxide in the vaporized material.

15. The process according to claim 13, wherein the additives are $Al_2O_3$, $B_2O_3$, and MgO.

16. The process according to claim 15, wherein the quantitative ratio of $SiO_2$, $Al_2O_3$, $B_2O_3$ and MgO to Si, Al, B and Mg is set such that stoichiometrically said quantitative ratio gives an oxygen deficiency of between 10 and 30 percent in relation to the sums of the pure oxides in the vaporized material.

17. The process according to claim 13, wherein the additives are present in an amount of 5 to 30 mol percent, always in relation to $SiO_2$.

18. The process comprising placing the composite film produced according to the process of claim 11 into the form of sachets and flexible container covers as sterilizible packaging for basic and luxury food items.

* * * * *